United States Patent
Weiler et al.

(10) Patent No.: US 7,007,339 B2
(45) Date of Patent: Mar. 7, 2006

(54) WIPER BLADE FOR CLEANING PANES OF GLASS, PARTICULARLY IN MOTOR VEHICLES

(75) Inventors: Michael Weiler, Karlsruhe (DE); Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 413 days.

(21) Appl. No.: 10/275,608

(22) PCT Filed: Feb. 26, 2002

(86) PCT No.: PCT/DE02/00702

§ 371 (c)(1),
(2), (4) Date: Nov. 7, 2002

(87) PCT Pub. No.: WO02/074591

PCT Pub. Date: Sep. 26, 2002

(65) Prior Publication Data

US 2003/0145412 A1 Aug. 7, 2003

(30) Foreign Application Priority Data

Mar. 16, 2001 (DE) ................................ 101 12 658

(51) Int. Cl.
*B60S 1/38* (2006.01)
(52) U.S. Cl. ............................ 15/250.201; 15/250.48; 15/250.43
(58) Field of Classification Search ........... 15/250.201, 15/250.48, 250.41, 250.451, 250.44, 250.43, 15/250.361, 250.452
See application file for complete search history.

(56) References Cited

U.S. PATENT DOCUMENTS

| | | | |
|---|---|---|---|
| 2,794,203 A | | 6/1957 | Oishei |
| 3,238,555 A | * | 3/1966 | Cels ......................... 15/250.04 |
| 3,418,679 A | * | 12/1968 | Barth et al. ............ 15/250.201 |
| 3,961,395 A | * | 6/1976 | Journee ................... 15/250.48 |
| 4,063,328 A | * | 12/1977 | Arman .................... 15/250.43 |
| 4,361,927 A | | 12/1982 | Matsui et al. |
| 4,722,112 A | * | 2/1988 | Schaub et al. ......... 15/250.451 |
| 5,206,969 A | | 5/1993 | Patterson et al. |

FOREIGN PATENT DOCUMENTS

| | | | |
|---|---|---|---|
| DE | 32443 | * | 3/1956 |
| DE | 1 505 257 | | 6/1969 |
| DE | 2 122 678 | | 11/1972 |

* cited by examiner

*Primary Examiner*—Gary K. Graham
(74) *Attorney, Agent, or Firm*—Michael J. Striker

(57) ABSTRACT

A wiper blade is proposed which is used to clean windows, especially of motor vehicles. The wiper blade is displaceable transversely to its length, preferably about a pendulum axis, and can be pressed with an elongated, rubber-elastic wiper strip (46) against the window (54) to be wiped; the wiper strip is disposed on the lower band face (49), oriented toward the window, of a bandlike-elongated, spring-elastic support element (42). Chattering that occurs during wiping operation and causes an unsatisfactory outcome of wiping as well as considerable noise, is avoided if the region of the upper band face (43), remote from the window, of the support element (42), the wiper blade is provided with a mass body, which is disposed movably, at least in the displacement direction (74) of the wiper blade.

8 Claims, 3 Drawing Sheets

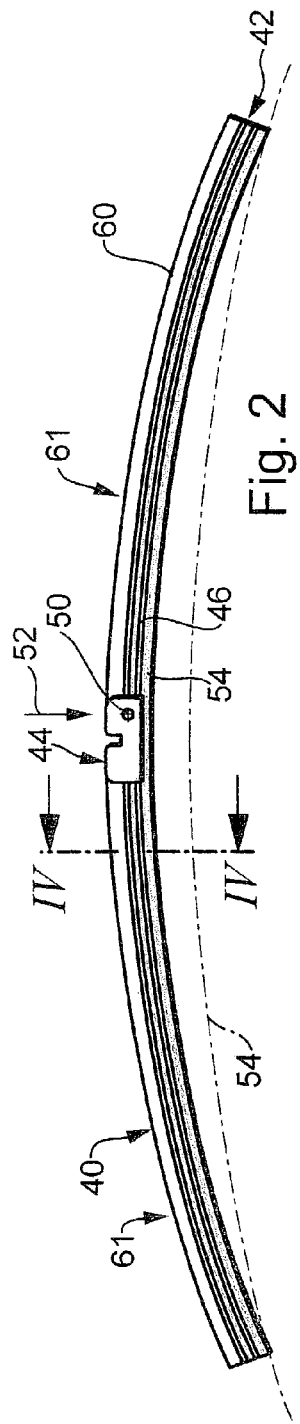
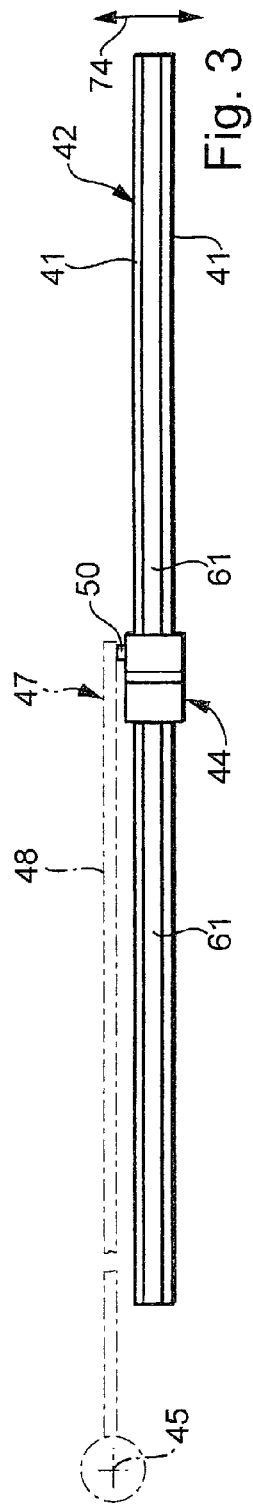
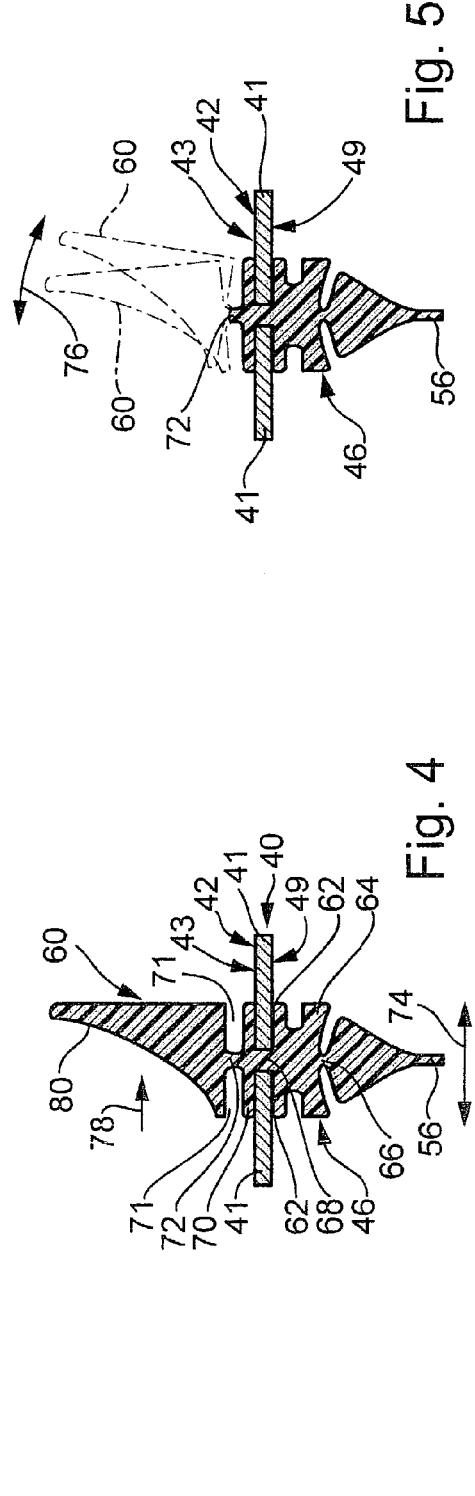

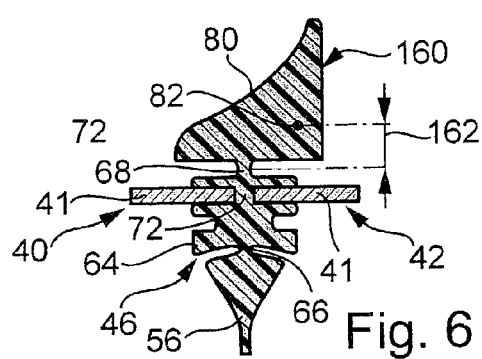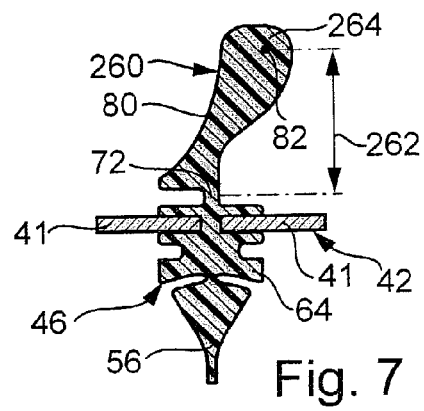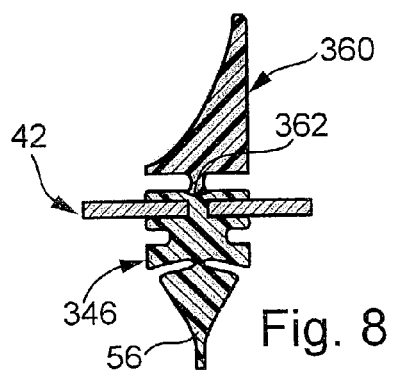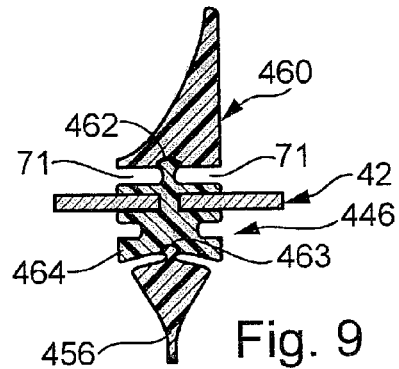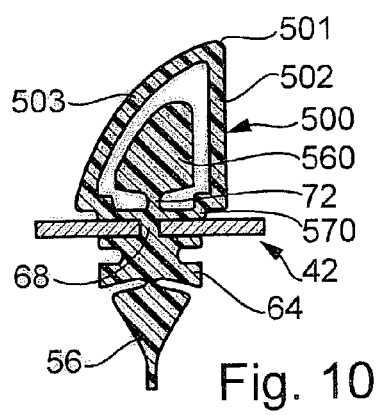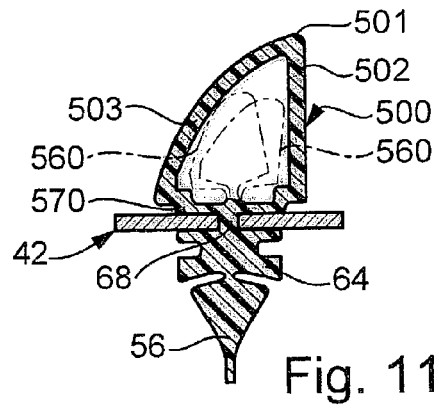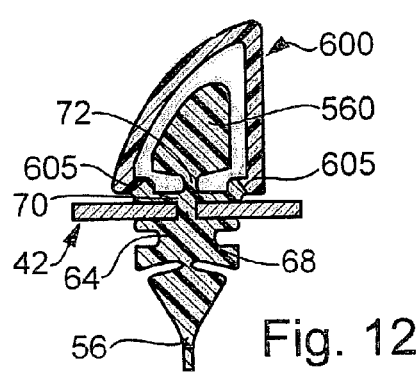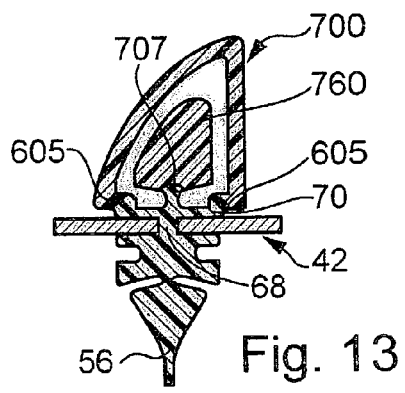

WIPER BLADE FOR CLEANING PANES OF GLASS, PARTICULARLY IN MOTOR VEHICLES

BACKGROUND OF THE INVENTION

In certain types of wiper blades, the support element is meant to assure the most uniform possible distribution, over the entire field swept by the wiper blade, of the wiper blade contact pressure, originating in the wiper arm, against the window. By means of a suitable curvature of the unstressed support element—that is, when the wiper blade is not resting on the window—the ends of the wiper strip, which in wiper blade operation presses completely against the window, are stressed toward the window by the then-tensed support element, even if the radii of curvature of spherically curved vehicle windows change at every position of the wiper blade. The curvature of the wiper blade must accordingly be somewhat greater than that in the swept field, at the most pronounced measured curvature of the window to be wiped. The support element thus replaces the known, complicated support bracket construction with two spring rails disposed in the wiper strip and serving to reinforce the rubber-elastic wiper strip transversely (German Published, Nonexamined Patent Application DE-OS 15 05 257).

In wiper systems with a wiper blade that is guided over the window transversely to its length, a problem can arise which will now be explained in conjunction with FIG. 1 of the drawing: In the wiping motion that takes place in pendulum-type wiper system 10 (double arrow 12 between pendulum turning points 14), a wiper blade 18 pivotably connected to a driven wiper arm 16 cleans a wiping field 20 shaped like an annular segment, and the wiper arm 16 supported on one end swings like a pendulum, together with the wiper blade 18, about an axis 22. The wiper blade 18 is pivotably connected to the free end of the wiper arm 16 in such a way that the wiper blade can swing about an axis 24 oriented approximately parallel to the window and can adapt to the course of the window surface, which because of its shaping differs from the plane in which the wiper arm swings. The wiping field boundary is defined by the two pendulum turning points 14 and the wiper radii 26 and 28, of which the outer, longer radius 28 is defined by the end 30 of the wiper blade 18 remote from the pendulum axis, while the inner, shorter radius 26 is defined by the end 32 of the wiper blade 18 near the pendulum axis. A peculiarity of such wiper systems is considered to be that the speed at which the wiper blade 18 sweeps over the window increases from the inner radius 26 to the outer radius 28. Thus the forces of friction decrease steadily from the shorter radius 26 to the longer radius 28, as a function of the speed. The result is a moment acting on the known wiper blade that loads the wiper blade, or seeks to rotate it, about a vertical axis 34 perpendicular to the window. The alternating stress (double arrow 36) resulting as a function of the constantly changing pendulum direction (double arrow 12) acts on the support point between the wiper arm 16 and the wiper blade 18, which must therefore be designed as sufficiently stable. Vibrations caused by the moment in the wiper arm and in the wiper blade—which causes the wiper blade to exert a so-called "stick-slip" effect on the window—also worsen the outcome of wiping.

To overcome this deficiency, in a known wiper blade (German Published, Nonexamined Patent Application DE-OS 21 22 678), which for the sake of the most uniform possible distribution of the force originating in the wiper arm for pressing the wiper strip against the window is nevertheless provided with a multi-member support bracket frame, on whose end remote from the drive shaft, or from the wiper arm hub that can be connected to that shaft, of the support frame main bracket a leaf spring is disposed, which is fixed by its one end to the main bracket. On the other, free end of the leaf spring, which spring can be deflected in the direction of displacement of the wiper blade, a small lead plate is mounted on each side of the spring leaf. If during the wiping work the wiper blade begins to chatter—which essentially leads to vibration in the plane of motion of the wiper blade—then the leaf spring is also induced to vibrate. Because of the inertia of the small lead plates—given a suitable adaptation of the leaf spring in terms of its length and thickness and of the adapted magnitude of the weight of the small lead plates—the vibrations of the leaf spring are in the opposite direction, with a time lag, from the vibrations originating in the wiper blade and cancel the latter out.

SUMMARY OF THE INVENTION

To counteract chattering of the wiper blade of this generic type, it is embodied in accordance with the definitive features of the present invention. As a result, the structural height of the support element, which is low because of the support element can be kept low. The length of the wiper blade also remains limited to the minimum amount necessary for wiping.

If the mass body is embodied in striplike fashion and extends longitudinally of the support element, then depending on the applicable criteria it can be provided with a suitable length, which is at maximum approximately equivalent to the length of the wiper blade. In this way it is possible to adapt the available mass to requirements, without requiring greater space for the wiper blade.

In a refinement of the invention, the support element has two spring rails, spaced apart from one another and extending parallel to one another and disposed in the same plane, and the wiper strip, over at least a part of its length, extends with an extension through a gap between the two spring rails. At least one mass body can be disposed in a simple way on the extension.

For many applications, in which the demand for a spoiler must be considered, the mass body is advantageously embodied as a spoiler.

To vary the center of gravity of the mass body relative to the support element and thus to vary its vibration frequency, it can be expedient if the mass body has an at least approximately triangular cross section, or if the mass body, viewed in cross section, is provided with a thickened portion on its free end remote from the extension.

In a refinement of the concept of the invention, the spoiler comprises a different material from the wiper strip that is fabricated jointly with it and solidly connected to it. This makes it possible to choose a material that is especially suitable both for the wiper strip and for meeting the demands made of the wiper strip, while the desire for a mass body or the spoiler can be respected in a particular way.

In applications with especially stringent demands made of the wiper blade and its spoiler, a multiple-material composite of these elements can be achieved by providing that the wiper strip has a base body, which on a side remote from the window changes over via the extension to the spoiler and furthermore, a striplike wiper lip that can be placed against the window and that is made from a different material jointly with the base body and is joined thereto via a rib strip is disposed on the side of the base body toward the window.

A further feature of the invention provides that a spoiler embodied as an elongated hollow body is formed onto the extension, and located in the cavity of the spoiler is the mass body that is joined to the extension and is movable in the displacement direction of the wiper blade.

In such embodiments of the wiper blade, it has proved especially advantageous if viewed in cross section, the extension of the wiper strip changes over, at the upper band side of the support element, into a bandlike base strip, with which the wiper strip is connected via an articulated strip formed by longitudinal grooves that are laterally open at the edges. The support element thus includes two spring bands, located in the same plane extending approximately parallel to the window, which rest in grooves assigned to them that are bounded at the top by the base strip. The spacing between the inner edges, oriented toward one another, of the spring bands makes it possible for the wiper strip to pass through support element. The articulated strip makes the requisite mobility of the mass body in the displacement direction of the wiper blade possible, and its dimensioning is oriented to the requirements in terms of the requisite vibration frequency of the mass body.

If, viewed in cross section, the extension of the wiper strip changes over, at the upper band side of the support element, into a bandlike base strip, with which the hollow body, comprising a different material but fabricated jointly with the wiper strip, is solidly connected via an articulated strip formed by longitudinal grooves that are laterally open at the edges, then for the choice of material for the hollow body, it is possible to a material that is especially advantageous for it, yet is unsuited to meeting the demands made of the wiper strip.

Further advantages for the wiper blade of the invention can be attained if the mass body comprises a different material from the wiper strip, the latter being fabricated jointly with it and solidly joined to it.

As already noted, for a prescribed distribution of the contact pressure of the wiper blade or the wiper arm, it is a basic prerequisite that the unstressed support element is curved in the longitudinal direction, with the connection device for the wiper arm located on the convex outer side of the support element and the wiper strip disposed on the concave inner side of the support element.

Other advantageous refinements and features of the invention are disclosed in the ensuing description of exemplary embodiments shown in the associated drawing.

BRIEF DESCRIPTION OF THE DRAWINGS

In the drawing,

FIG. 2 is a side view of a wiper blade of the invention;

FIG. 3 is a top view on the wiper blade of FIG. 2, with the wiper arm indicated by dot-dash lines;

FIG. 4 is an enlarged sectional view through the wiper blade of FIG. 2, taken along the line IV—IV;

FIG. 5 shows the arrangement of FIG. 4, with the terminal vibration positions of a mass body disposed on the wiper blade shown in dot-dash lines;

FIG. 6 shows a different design of the mass body located on the wiper blade;

FIG. 7 shows the arrangement of FIG. 4, with a further design of the mass body located on the wiper blade;

FIG. 8 shows the arrangement of FIG. 4 with a wiper strip made of two materials;

FIG. 9 shows the arrangement of FIG. 4 with a multiple-material wiper strip;

FIG. 10 shows the arrangement of FIG. 4, in which the mass body is accommodated in a spoiler provided with a cavity;

FIG. 11 shows the arrangement of FIG. 10, with the terminal vibration positions of the mass body of FIG. 10 shown in dot-dash lines;

FIG. 12 shows the arrangement of FIG. 10, in which the spoiler is made of a different material from the wiper strip; and FIG. 13 shows the arrangement of FIG. 12, in which the mass body is also made of a different material from the wiper strip.

DETAILED DESCRIPTION OF THE PREFERRED EMBODIMENTS

Figure 1:
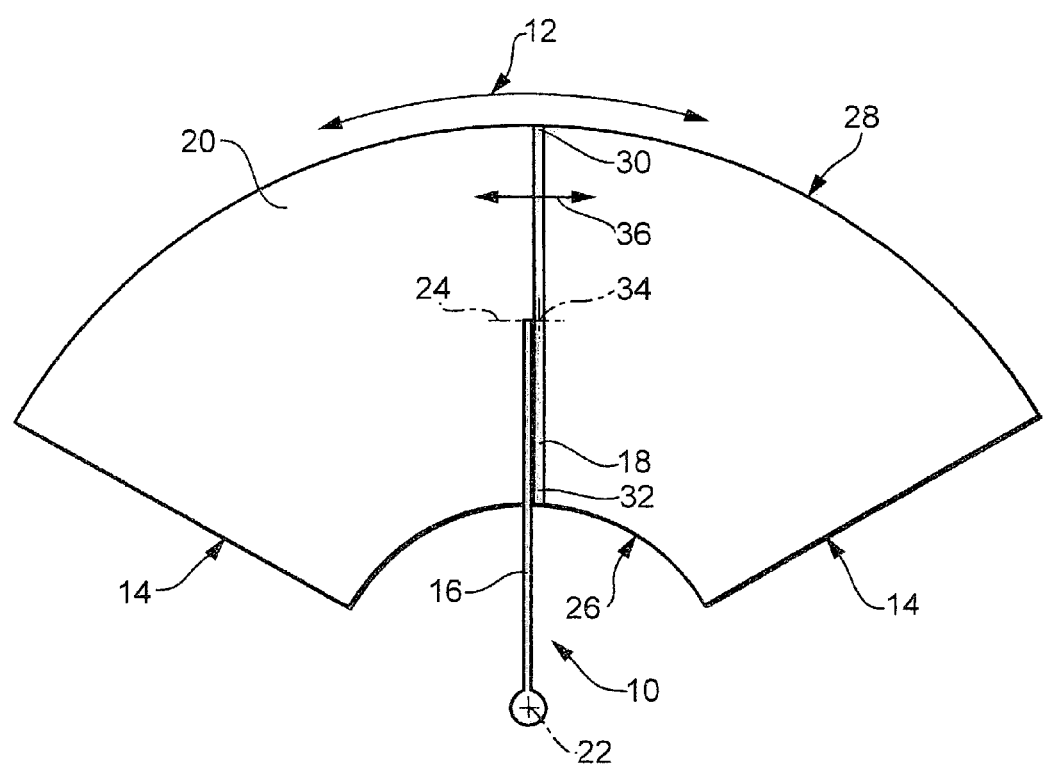
FIG. 1 is a basic illustration of a pendulum wiper system for windows of motor vehicles, with a wiper blade pivotably connected to the wiper arm and showing the field swept by the wiper blade.

A wiper blade 40, shown in FIGS. 2 and 3, of a first embodiment of the invention has a bandlike-elongated, spring-elastic support element 42 with two spaced-apart, parallel spring rails 41 extending in the same plane. In the middle portion of the support element 42 (FIG. 4), on the top side 43 remote from the window 54 to be wiped, a connection device 44 is disposed, with the aid of which the wiper blade 40 can be connected releasably to a wiper arm 48 (FIGS. 2 and 3) driven in pendulum fashion about a pendulum axis 45 and guided on the body of a motor vehicle. An elongated, rubber-elastic wiper strip 46 is retained, longitudinally axially parallel, on the underside 49 of the support element 42, oriented toward the window 54. As a counterpart connection means, a pivot bolt 50 belonging to the connection device 44 of the wiper blade 40 is provided on the free end 47 of the wiper arm 48; it cooperates in the manner of a joint with a support point that is present in the connection device 44. The wiper arm 48 and thus the wiper blade 40 as well are urged in the direction of the arrow 52 toward the window 43 to be wiped, whose surface to be wiped is represented in FIG. 2 by the dot-dash line 54. Since the dot-dash line 54 is meant to represent the greatest curvature of the window surface, it is quite clear that the longitudinal curvature of the still-unloaded wiper blade, resting with its ends on the window, is greater than the maximum window curvature. That is—unloaded—it has a concave course facing the window. On the convex outer top side 43 of the support element 42, the connection device 44 is seated, while on the concave inner underside 49 of the support element 42, the wiper strip 46 is disposed, with its wiper lip 56 that performs the wiping work. In response to the contact pressure (arrow 52), the wiper blade 40, with its wiper lip 56, presses over its entire length against the window surface 50 and changes over into a working position that approximates the extended position. In this process a tension builds up in the bandlike, spring-elastic support element 42, and this tension provides for a proper contact between the wiper strip 46, or its wiper lip 56, over its entire length with the motor vehicle window 54 and thus assures a prescribed distribution of the contact pressure.

The particular features of the wiper blade 40 of the invention will now be addressed in further detail. In a first embodiment (FIGS. 4 and 5), the wiper blade 40 is provided with a striplike mass body 60, which extends in the longitudinal direction of the support element 42. The mass body 60 is disposed in the region of the upper band face 43, remote from the window, of the support element 42. In the exemplary embodiment, the support element 42 has two spaced-apart, parallel spring rails 41, extending in the same plane, which rest in laterally peripherally open longitudinal grooves 62 of the wiper strip 46. The wiper strip 46 has a base body 64 of substantially square cross section, with the wiper lip 56 located on its lower side, the side toward the window. The wiper lip 56 itself is connected to the base body 64 via a narrow tilting rib 66. The base body 64 has the two longitudinal grooves 62, laterally open on the periphery, for the spring rails 41 of the support element 42. The wiper strip, or its base body 64, extends with an extension 68 through the gap between the two spring rails 41, and this gap changes over, at the upper band face 43 of the support element 42, into a bandlike base strip 70. On the top side, remote from the support element, of the base strip 70, this strip changes over, because of the disposition of two laterally peripherally open longitudinal grooves, into a narrow articulated strip 72, which likewise extends longitudinally of the wiper blade 18. Thus the wiper strip 46 includes the base body 64, with its extension 68 and the base strip 70; the tilting rib 66; the wiper lip 56 that performs the wiping work; the articulated strip 72; and the mass body 60. The mass body 60 spaced apart from the base body 64, or from its base strip 70, on the articulated strip 72, or else the mass body is integrally joined to the base body 64 via the articulated strip 72. Since the articulated strip 72 thus likewise comprises a rubber-elastic material, the mass body 60 is disposed movably in the displacement direction of the wiper blade (double arrow 74), so that it can oscillate over a certain angle about the articulated strip 72. This oscillating motion is represented in FIG. 5 by a double arrow 76. The mass body itself is represented in FIG. 5 in its two terminal vibration positions by dot-dash lines.

Now if during wiper operation—in which the wiper blade 18 is displaced transversely to its length in the direction of the double arrow 74 (FIG. 4) over the window 54—and if for instance because of the aforementioned circumstances the sliding motion of the wiper blade changes into a chattering motion, then the mass body 60 is put into a vibrating motion (double arrow 76) that is chronologically opposite the chattering motion, so that the chattering vibrations are suppressed near their origin. This is true especially if the magnitude of the mass of the mass body 60 and the dimensioning of the articulated strip 72 are adapted to the criteria of the particular application of the wiper blade. Hence the chattering vibrations cannot be propagated via the wiper arm to the gear and to the drive motor of the wiper system, so that even these drive components of the wiper system are not induced to vibrate and thus cause noise. An especially advantageous feature of the invention is considered to be that the mass body 60 is embodied as a spoiler. To that end, on its long side that during wiper operation is oriented toward the primary air flow (arrow 78), the mass body has a hollow throat 80, which counteracts the forces that seek to lift the wiper blade, especially at vehicle speeds. The length of the mass body embodied as a spoiler depends on the particular vehicle-specific conditions. It can be seen from FIGS. 2 and 3 that the mass body 60 has two partial mass bodies 61, which are disposed one on each side of the connection device 44.

The location of the center of gravity of the mass body relative to the longitudinal axis of the center of gravity relative to the articulated strip 72 can also contribute substantially to an effective elimination of the chattering vibrations. Two examples of this are shown in FIGS. 6 and 7. Since the two exemplary embodiments differ from the exemplary embodiment already described, shown in FIGS. 4 and 5, only in terms of the cross-sectional shape, the reference numerals used for the above exemplary embodiment are used here as well—where necessary. In the compact cross-sectional shape of FIG. 6, the result is a center of gravity line of the mass body 160, embodied as a spoiler, whose effective spacing 162 from the articulated strip 72 is relatively slight.

Conversely, the effective spacing 262 from the articulated strip 72 in the embodiment, also in the form of a spoiler, of FIG. 7 is relatively great. This is due to the fact that in the exemplary embodiment of FIG. 7, the mass body 260, viewed in cross section, is provided with an enlargement 264 on its free end remote from the extension 68.

In a departure from the exemplary embodiments described above, in which the wiper strip 46 has three striplike regions integrally joined to one another—that is, the base body 64, wiper lip 56, and mass body strip 60, 160 and 260—in the embodiment of FIG. 8 the mass body strip 360 of the wind strip 346 is made of a different material from the base body strip 364 with its wiper lip 56. The connecting seam between the base body strip 364 and the mass body strip 360 is identified in FIG. 8 by reference numeral 362. In this embodiment as well, the mass body strip 360 is embodied as a spoiler. Because of this particular design, it is possible to optimize the choice of materials in such a way that the mass body strip 360, for instance, is stiffer than the base body strip 364 with its wiper lip 56.

In the embodiment of FIG. 9 as well, the mass body strip 460 embodied as a spoiler is made from a different material from the base body strip 464. The connecting seam is identified there by reference numeral 462. Furthermore, the wiper lip 456 is likewise of a different material from the base body strip 464. The connecting seam between the base body strip 464 and the wiper lip 456 is identified in FIG. 9 by reference numeral 463. Along with the advantage, already mentioned, of the stiffening of the mass body strip 460 relative to the base body strip 464, for instance, it is also possible in this embodiment for the wiper lip strip 456 to be further optimized in terms of the choice of material, with a view to the results of wiping sought.

A common feature of the embodiments of FIGS. 10, 11 and FIGS. 12 and 13 is that a spoiler embodied as an elongated hollow body is formed onto the extension 68, or onto the base strip 70 adjoining the extension of the wiper strip, or of the base body 64, in the cavity of which hollow body, the mass body is located—protected against the oncoming flow of air—the mass body being joined to the extension or to the base strip and being movable in the displacement direction of the wiper blade. From FIG. 10 it can be seen that the spoiler 500 embodied as a hollow body surrounds the striplike mass body 560 with spacing. The spoiler has two legs 502, 503, diverging from an apex line 501, and the ends of the legs change over, near the support element 42, to the base strip 570. In FIG. 11, the two terminal positions of the vibrating motion of the mass body 560 are indicated by dot-dash lines. In dimensioning the mass body, or the spoiler 500 embodied as a hollow body, care must be taken to assure that the mass body strip 560 is not restricted in terms of its freedom of motion by the legs 502, 503 of the spoiler 500. If the mass body strip were to strike the inner walls of the legs, the result would be further uncontrollable vibrations in the wiper blade.

In the embodiment of FIG. 12, the spoiler 600 is made from a different material from the wiper strip, with its base body strip 64, wiper lip strip 56, and mass body strip 560. The resultant connecting seams are identified in FIG. 12 by reference numeral 605.

The embodiment of FIG. 13 is substantially equivalent to that of FIG. 12; once again, the spoiler 700 is of a different material from the base body strip 64 with its wiper lip strip 56. However, in the embodiment of FIG. 13, the mass body strip 760 is formed of a different material from the base body strip 64 and/or from the spoiler 700. The resultant connecting seam is identified in FIG. 13 by reference numeral 707.

It is a common feature of all the embodiments proposed here for the invention that they can be produced by the economical extrusion process. For the embodiments of FIGS. 8 and 12, so-called dual-substance extrusion is attractive, while for the embodiment of FIGS. 9 and 13, so-called multiple-substance extrusion is advantageous.

Another substantial common feature of all the described embodiments of the invention is considered to be that in the region of the upper band face 43, remote from the window, of the support element 42, the wiper blade 40 is provided with a mass body 60, 160, 260, 360, 460, 560, 660, or 760, which is disposed movably at least in the displacement direction (double arrow 74) of the wiper blade.

What is claimed is:

1. A wiper blade for cleaning windows of motor vehicles, which transversely to its length is displaceable about a pendulum axis and which can be pressed, with an elongated, rubber-elastic wiper strip (46), against the window (54) to be wiped, and the wiper strip is disposed on the lower band face (49), oriented toward the window, of a bandlike-elongated, spring-elastic support element (42), wherein in the region of the upper band face (43), remote from the window, of the support element (42), the wiper blade is provided with a mass body (60, 160, 260, 360, 460, 560, 660, or 760, respectively), which is disposed freely movably, and in particular tiltably, relative to the wiperstrip and support element at least in the displacement direction (74) of the wiper blade, to surpress chattering motion of the wiper blade wherein the support element (42) has two spring rails (41), spaced apart from one another and extending parallel to one another and disposed in the same plane, wherein the wiper strip, over at least a part of its length, extends with an extension (68) through a gap between the two spring rails, wherein at least one mass body (60, 160, 260, 360, 460, 560, 660, or 760, respectively) is disposed on the extension, wherein the wiper strip has a wiper lip connected via a tilting rib below the support element, wherein the at least one mass body is a spoiler, and wherein the spoiler comprises a different material from the wiper strip that is fabricated jointly with it and solidly connected to it.

2. The wiper blade of claim 1, wherein the mass body (60, 160, 260, 360, 460, 560, 660, or 760, respectively) is embodied in striplike fashion and extends in the longitudinal direction of the support element (42).

3. The wiper blade of claim 1, wherein the mass body (60, 160, 360, or 460, respectively) has an at least approximately triangular cross section.

4. The wiper blade of claim 1, wherein the mass body (260), viewed in cross section, is provided with a thickened portion (264) on its free end remote from the extension (72).

5. The wiper blade of claim 1, wherein the support element (42) in an unstressed state, is curved in the longitudinal direction; that a connection device (44) for a wiper arm (48) is located on the convex outer side (43) of the support element (42); and that the wiper strip (46) is disposed on the concave inner side (49) of the support element (42).

6. A wiper blade for cleaning windows of motor vehicles, which transversely to its length is displaceable about a pendulum axis and which can be pressed, with an elongated, rubber-elastic wiper strip (46), against the window (54) to be wiped, and the wiper strip is disposed on the lower band face (49), oriented toward the window, of a bandlike-elongated, spring-elastic support element (42), wherein in the region of the upper band face (43), remote from the window, of the support element (42), the wiper blade is provided with a mass body (60, 160, 260, 360, 460, 560, 660, or 760, respectively), which is disposed freely movably, and in particular tiltably, relative to the wiper strip and support element at least in the displacement direction (74) of the w per blade, to suppress chattering motion of the wiper blade wherein the wiper strip has a base body (64), which on a side remote from the window (54) changes over via an extension (68) to the mass body (60, 160, 260, 360, or 460, respectively); and that a striplike wiper lip (56) that can be placed against the window and that is made jointly with the base body from a different material than the mass body and is joined thereto via a rib strip which is disposed on the side of the base body (64) toward the window (54).

7. The wiper blade of claim 6, wherein a spoiler (500 or 260 or 600 or 700) embodied as an elongated hollow body is formed onto the extension (68), and located in the cavity of the spoiler is the mass body (560 or 760) that is joined to the extension and is movable in the displacement direction (74) of the wiper blade.

8. The wiper blade of claim 6, wherein viewed in cross section, the extension (68) of the wiper strip changes over, at the upper band side of the support element, into a bandlike base strip (70), with which the mass body comprising a different material but fabricated jointly with the wiper strip, is solidly connected via an articulated strip (72) formed by longitudinal grooves (71) that are laterally open at the edges.

* * * * *